3,241,929
INHIBITION OF CALCIUM SULFATE DISSOLUTION DURING BRINE PREPARATION
Gerald K. Jordan, Maplewood, and Claude A. Burns, Lake Charles, La., assignors to Pittsburgh Plate Glass Company, Pittsburgh, Pa., a corporation of Pennsylvania
No Drawing. Filed Apr. 26, 1961, Ser. No. 105,573
7 Claims. (Cl. 23—312)

This invention relates to a process of preparing sodium chloride brine of high purity. It is particularly directed to the extraction of sodium chloride in the form of brine of high purity from natural deposits of alkali metal chlorides, such as sodium chloride or potassium chloride, or from dry mined salts obtained by mining such natural deposits.

Sodium chloride and potassium chloride are obtained chiefly from natural deposits. They may be mined dry as rock salt or they may be recovered as aqueous solutions by sinking wells in the natural deposits and extracting the deposit with water. For example, it is common practice to recover sodium chloride by drilling a well into a natural deposit of sodium chloride and pumping water into the well whereby the sodium chloride is dissolved, and removing brine from the well. Brines are also produced by mining the natural deposit of potassium chloride which usually contains sodium chloride and then dissolving the mined salt in aqueous solution.

In either case, it is found that the natural deposits frequently contain substantial quantities of calcium sulfate. This calcium sulfate, which may be in the form of anhydrite, often is present in concentrations ranging from about 0.5 to about 12 percent by weight of the rock salt.

Since calcium sulfate has a substantial water solubility, extraction of the rock salt or extraction of the natural deposit produces brine which not only contains sodium chloride or potassium chloride but also contains calcium sulfate as an impurity. For many purposes, this impurity is objectionable and methods must be resorted to in order to remove the calcium sulfate or at least to reduce the concentration thereof.

According to the present invention it has been found that this concurrent dissolving of calcium sulfate can be substantially inhibited in the dissolution of sodium chloride or potassium chloride, whether in natural deposit or in solid rock salt obtained by mining such deposit, by incorporating in the water used for dissolving the alkali metal chloride a substantial quantity of a gluconate. The term "gluconate," as used herein, means gluconic acid and the water soluble salts thereof, such as ammonium gluconate, calcium gluconate, sulfur gluconate, magnesium gluconate, potassium gluconate, and sodium gluconate. Usually, the gluconate used is either gluconic acid itself or the salt corresponding to the alkali metal of the alkali metal chloride dissolved. For example, in dissolving sodium chloride, it is preferred to use either sodium gluconate or gluconic acid. Likewise, in dissolving potassium chloride, it is preferred to use potassium gluconate or gluconic acid. This avoids unnecessary contamination of the brine with other metallic ions.

The amount of gluconate required is quite small. In general, the amount of gluconate in the water used to extract the alkali metal chloride or to dissolve the same may be in the general range of 10 to 200 parts per million by weight based upon the amount of water used in the extraction. This solution also may contain other component, such as alkali metal hydroxide, for example, sodium hydroxide or potassium hydroxide, and alkali metal carbonates or bicarbonates, for example, sodium carbonate, sodium bicarbonate, potassium carbonate, and potassium bicarbonate. These materials may be used to adjust the pH of the water used to conduct the extraction and/or to deal with other impurities which may be present in the rock salt or natural deposit.

In the practice of the process, water which is conventionally used for preparation of brine is treated by adding a small amount of the gluconate thereto and then is used to extract the rock salt or brine. For example, it is conventional practice to extract sodium chloride by means of wells substantially as described in U.S. Patent No. 1,923,896.

The process herein contemplated may be effected simply by introducing a small amount of the water soluble gluconate into the water going into the well and continuing the process in the conventional manner. Usually, where the salt cavity is relatively large, this process will need to be continued for a substantial period of time, often for several weeks, before sulfate reduction is observed. Ultimately, however, the presence of gluconate produces inhibiting effect upon the amount of calcium sulfate which is found to be dissolved in the brine. Thus, as the process continues, the calcium sulfate in the brine gradually falls substantially from the level which is observed when no water soluble gluconate is used.

The following are typical examples:

A salt core obtained by drilling in a natural salt deposit and containing 89.93 percent by weight of NaCl and 7.77 percent by weight of $CaSO_4$ was placed in a pool of water and allowed to stand at room temperature for 264 hours. The pH of the water was 7.3. The brine thus obtained contained 319 grams of NaCl per liter and 2.98 grams of calcium sulfate per liter.

In a further experiment, a portion of the same core was placed in a pool of water containing 0.3 gram of sodium bicarbonate per liter and 30 parts per million of sodium gluconate and the pool allowed to stand at room temperature for 264 hours. The resulting solution contained 320 grams per liter of sodium chloride and only 1.96 grams of calcium sulfate per liter of solution.

In a third test wherein the salt core was kept in the water for 173 hours, a solution containing 317 grams of NaCl per liter and only 1.42 grams of calcium sulfate per liter of solution was obtained using water containing 0.3 gram of sodium bicarbonate per liter and 100 parts per million of sodium gluconate.

The above process can be conducted at various acidities or alkalinities of the brine. With gluconates, the treatment is most effective in an alkaline brine, e.g., a brine in a pH range from about 7 to 10. However, a sodium chloride brine low in calcium sulfate which may have an acidic pH, e.g., a pH below 7, may be treated. If desired, the pH of the brine may be adjusted by addition of small amounts of caustic soda and/or sodium carbonate or sodium bicarbonate or other alkali in the form of alkali metal hydroxide, carbonate or bicarbonate. The concentration of gluconate which is used is normally below one percent, usually ranging from about one to 200 parts of the gluconate per million parts of brine.

Also, it will be understood that gluconic acid, potassium gluconate or other salts of gluconic acid which are soluble in the amounts specified (at least one to 200 parts per million parts of water) may be used in lieu of sodium gluconate.

One advantage which accrues by virtue of the use of gluconates, such as gluconic acid or the salts thereof, lies in the fact that this material may be used without adjustment of pH by addition of alkali. Moreover, the presence of certain impurities, such as sulfides, hydrogen sulfide, and the like, in the brine obtained does not adversely affect the gluconate and therefore brines can be prepared from rock salt or natural formations containing such sulfides and the dissolution of calcium sulfate effectively inhibited, whereas other processes are ineffective.

According to a further embodiment of the present invention, it has also been found that other aliphatic hydroxy carboxylates containing 3 to 8 carbon atoms, the sum of hydroxyl and carboxyl groups therein being at least 3, may be used in lieu of gluconates. The term "polycarboxylate" includes both the acid and the salts thereof which are water soluble. Typical polycarboxylates which are suitable for this purpose include citric acid, malic acid, mucic acid, tartaric acid, and like hydroxy carboxylic acids as well as their water soluble salts, such as the alkali metal salts and alkaline earth metal salts thereof. These compounds may be used in lieu of sodium gluconate in practice of the examples set forth above using the concentrations specified above.

Although the present invention has been described with reference to the specific details of certain embodiments thereof, it is not intended that such details shall in any way limit the scope of the invention except to the examples expressly set forth in the claims.

What is claimed is:

1. A method of preparing an alkali metal chloride brine by extraction of solid alkali metal chloride which is contaminated with calcium sulfate which comprises dissolving the contaminated alkali metal chloride in water in the presence of a gluconate to inhibit concurrent dissolving of calcium sulfate.

2. A method of preparing an alkali metal chloride brine by extraction of solid alkali metal chloride which is contaminated with calcium sulfate which comprises dissolving the contaminated alkali metal chloride in water in the presence of sodium gluconate to inhibit concurrent dissolving of calcium sulfate.

3. A method of preparing an alkali metal chloride brine by extraction of solid alkali metal chloride which is contaminated with calcium sulfate which comprises dissolving the contaminated alkali metal chloride in water in the presence of a polycarboxylate to inhibit concurrent dissolving of calcium sulfate.

4. A method of preparing an alkali metal chloride brine by extraction of solid alkali metal chloride which is contaminated with calcium sulfate which comprises dissolving the contaminated alkali metal chloride in water in the presence of an alkali metal polycarboxylate to inhibit concurrent dissolving of calcium sulfate.

5. A method of preparing an alkali metal chloride brine by extraction of solid alkali metal chloride which is contaminated with calcium sulfate which comprises dissolving the contaminated alkali metal chloride in water in the presence of a polycarboxylic acid to inhibit concurrent dissolving of calcium sulfate.

6. A method of preparing an alkali metal chloride brine by extraction of solid alkali metal chloride which is contaminated with calcium sulfate which comprises dissolving the contaminated alkali metal chloride in water in the presence of gluconic acid to inhibit concurrent dissolving of calcium sulfate.

7. A method of preparing sodium chloride brine by extraction of solid calcium sulfate contaminated sodium chloride which comprises dissolving said solid contaminated sodium chloride in water in the presence of a gluconate whereby to form sodium chloride brine containing less calcium sulfate than when no gluconate is present while maintaining the brine pH in the range from 7 to 10 and adjusting the gluconate concentration from 1 to 200 parts per million parts of water to inhibit concurrent dissolving of calcium sulfate.

References Cited by the Examiner

UNITED STATES PATENTS

| 2,108,783 | 2/1938 | Smith | 23—89 XR |
| 2,906,599 | 9/1959 | Roland | 23—89 XR |
| 2,906,600 | 9/1959 | Roland et al. | 23—89 XR |

OTHER REFERENCES

Chaberck and Martell: "Organic Sequestering Agents," Wiley, January 1960, pages 312–313 and 398–400.

NORMAN YUDKOFF, *Primary Examiner.*

JAMES H. TAYMAN, JR., *Examiner.*